United States Patent
Fujimura

(10) Patent No.: US 9,110,619 B2
(45) Date of Patent: Aug. 18, 2015

(54) IMAGE DATA PROCESSING DEVICE

(71) Applicant: Nikon Corporation, Tokyo (JP)

(72) Inventor: Tadashi Fujimura, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 13/713,607

(22) Filed: Dec. 13, 2012

(65) Prior Publication Data

US 2013/0100299 A1 Apr. 25, 2013

Related U.S. Application Data

(63) Continuation of application No. 13/067,300, filed on May 23, 2011, now abandoned, which is a continuation of application No. 12/285,453, filed on Oct. 6, 2008, now abandoned, which is a continuation of application No. 09/995,624, filed on Nov. 29, 2001, now Pat. No. 7,495,690.

(30) Foreign Application Priority Data

Dec. 1, 2000 (JP) .................................. 2000-367428

(51) Int. Cl.
*H04N 5/228* (2006.01)
*G06F 3/12* (2006.01)
*G03B 17/48* (2006.01)

(52) U.S. Cl.
CPC ................ *G06F 3/128* (2013.01); *G03B 17/48* (2013.01)

(58) Field of Classification Search
USPC ........ 348/222.1, 231.1, 231.2, 207.99, 207.1, 348/552
See application file for complete search history.

(56) References Cited

U.S. PATENT DOCUMENTS

| | | | |
|---|---|---|---|
| 6,035,323 A | 3/2000 | Narayen et al. | |
| 6,208,426 B1 * | 3/2001 | Saito et al. | 358/1.15 |
| 6,263,106 B1 | 7/2001 | Yamagata | |
| 6,362,851 B1 * | 3/2002 | Lavelle et al. | 348/333.01 |
| 6,400,392 B1 | 6/2002 | Yamaguchi et al. | |
| 6,522,354 B1 | 2/2003 | Kawamura et al. | |
| 6,532,039 B2 | 3/2003 | Anderson | |
| 6,545,687 B2 | 4/2003 | Scott et al. | |
| 6,606,662 B2 * | 8/2003 | Nagasaki | 709/229 |
| 6,618,553 B1 | 9/2003 | Shiohara | |

(Continued)

FOREIGN PATENT DOCUMENTS

| | | |
|---|---|---|
| JP | A-6-90422 | 3/1994 |
| JP | A-8-65403 | 3/1996 |

(Continued)

OTHER PUBLICATIONS

Sep. 21, 2010 Japanese Office Action (Final Rejection) issued in Japanese Application No. 2007-120650 (with translation).

(Continued)

*Primary Examiner* — Yogesh Aggarwal
(74) *Attorney, Agent, or Firm* — Oliff PLC

(57) ABSTRACT

An image data processing device includes: a basic image data acquisition device that acquires basic image data; a simplified image data generation device that generates simplified image data corresponding to the basic image data which has been acquired, a size of the simplified image data being smaller than that of the basic image data; a transmission device that transmits at least the basic image data to an external storage device; and an internal storage device that stores the simplified image data without storing the basic image data.

8 Claims, 10 Drawing Sheets

(56) References Cited

U.S. PATENT DOCUMENTS

| | | | |
|---|---|---|---|
| 6,784,925 B1 | 8/2004 | Tomat et al. | |
| 6,785,013 B1 | 8/2004 | Ota et al. | |
| 6,833,861 B2 | 12/2004 | Matsumoto et al. | |
| 6,967,675 B1 | 11/2005 | Ito et al. | |
| 6,977,680 B1 * | 12/2005 | Ichihara | 348/231.99 |
| 7,092,024 B2 | 8/2006 | Kawamura et al. | |
| 7,158,171 B1 | 1/2007 | Ichihara | |
| 7,287,088 B1 * | 10/2007 | Anderson | 709/235 |

FOREIGN PATENT DOCUMENTS

| | | |
|---|---|---|
| JP | A-8-123796 | 5/1996 |
| JP | A-8-153376 | 6/1996 |
| JP | A-9-149307 | 6/1997 |
| JP | A-09-322114 | 12/1997 |
| JP | A-10-341364 | 12/1998 |
| JP | A-11-46331 | 2/1999 |
| JP | A-11-109518 | 4/1999 |
| JP | A-11-146084 | 5/1999 |
| JP | A-11-203360 | 7/1999 |
| JP | A-11-275425 | 10/1999 |
| JP | A-11-341454 | 12/1999 |
| JP | A-2000-41170 | 2/2000 |
| JP | A-2000-253292 | 9/2000 |
| JP | A-2000-287110 | 10/2000 |

OTHER PUBLICATIONS

Sep. 21, 2010 Japanese Office Action (Decision of Dismissing an Amendment) issued in Japanese Application No. 2007-120650 (with translation).

Jun. 29, 2010 Notification of Reasons for Refusal for Japanese Application No. 2007-120650.

Apr. 6, 2010 Office Action issued in Japanese Patent Application No. 2007-120650 (with translation).

Mar. 15, 2011 Office Action issued in Japanese Patent Application No. 2010-130020 (with translation).

Jun. 14, 2012 Office Action issued in U.S. Appl. No. 13/067,300.

* cited by examiner

IMAGE DATA PROCESSING DEVICE

This is a Continuation application of U.S. patent application Ser. No. 13/067,300 filed on May 23, 2011, which is a continuation of U.S. patent application Ser. No. 12/285,453 filed on Oct. 6, 2008, which is a continuation of U.S. Pat. No. 7,495,690 issued on Feb. 24, 2009 previously known as U.S. patent application Ser. No. 09/995,624 filed on Nov. 29, 2001, which claims the benefit of Japanese Patent Application No. 2000-367428 filed on Dec. 1, 2000. The disclosures of the prior applications are hereby incorporated by reference herein in their entirety.

BACKGROUND OF THE INVENTION

1. Field of the Invention

The present invention relates to an image data processing device.

2. Description of the Related Art

Image data which has been recorded by an electronic camera is often transferred to and recorded in a data storage device which has a greater recording capacity than the recording medium which is generally provided to the electronic camera. This image data which has been recorded in the data storage device is read out by a personal computer or the like, and is displayed upon a display device which is connected to the personal computer, and/or is printed upon an output device which is connected to the personal computer. If the electronic camera and the data storage device are positioned in places which are remote from one another, and, if no display device is provided upon the data storage device side, in order for the person who is operating the electronic camera to check the images which correspond to the image data which is recorded in the data storage device, it is necessary to preserve the same image data as the image data which have been recorded in the data storage device in the recording medium of the electronic camera as well. Thus the operator of the electronic camera displays the images according to the image data which are recorded on the electronic camera side upon a monitor or the like for display which is provided to the electronic camera, and checks the displayed images.

This suffers from the problem that it becomes necessary to keep a large recording medium capacity on the electronic camera side in order to preserve the image data which have been recorded in the data storage device in the recording medium internal to the camera as well, and accordingly the size of the camera is increased and its cost mounts up.

SUMMARY OF THE INVENTION

The objective of the present invention is to provide an image data processing device having a capacity which does not store original image data which has been transmitted and stores simplified image data or the like corresponding thereto for management.

An image data processing device according to the present invention comprises: a basic image data acquisition device that acquires basic image data; a simplified image data generation device that generates simplified image data corresponding to the basic image data which has been acquired, a size of the simplified image data being smaller than that of the basic image data; a transmission device that transmits at least the basic image data to an external storage device; and an internal storage device that stores the simplified image data without storing the basic image data.

In this image data processing device, it is preferred that: an identifying information generation device that generates identifying information for individually identifying correspondence between the basic image data and the simplified image data is further provided; the signal transmission device transmits at least the basic image data and the identifying information to the external storage device; and the internal storage device stores the simplified image data and the identifying information. In this case, it is preferred that: the basic image data acquisition device, the simplified image data generation device, the transmission device, and the internal storage device perform processing for a plurality of sets of basic image data; a display device that displays a plurality of simplified images corresponding to a plurality of sets of simplified image data is provided; a selection device that selects a single simplified image from the plurality of simplified images which have been displayed upon the display device is provided; a command generation device that generates a delete command for deletion of simplified image data and basic image data corresponding to a simplified image which is selected by the selection device is provided; and the signal transmission device transmits identifying information and a delete command corresponding to the simplified image that has been selected, to the external storage device. Furthermore, it is preferred that: the command generation device generates a protect command for preventing deletion of simplified image data and basic image data corresponding to a simplified image that is selected by the selection device; and the signal transmission device transmits identifying information and a protect command corresponding to the simplified image that has been selected, to the external storage device. Moreover, it is preferred that: the command generation device generates a protection cancel command for canceling prevention of deletion of simplified image data and basic image data corresponding to a simplified image that is selected by the selection device; and the signal transmission device transmits identifying information and a protection cancel command corresponding to the simplified image that has been selected, to the external storage device.

Also, it is preferred that the identifying information includes inherent information that identifies the image data processing device individually.

Also, in the above image data processing device, it is preferred that the internal storage device temporarily stores the basic image data and the simplified image data, and deletes only the basic image data after the signal transmission device has transmitted the basic image data to the external storage device.

Also, it is preferred that the signal transmission device performs a communication with the external storage device by radio.

Also, it is preferred that: a power supply control device that turns off a supply of power to the image data processing device upon actuation of an actuation member is further provided; and if the actuation member is actuated while the signal transmission device is transmitting the basic image data to the external storage device, the power supply control device turns off the supply of power to the image data processing device after the signal transmission device has completed transmitting of the basic image data.

Also, it is preferred that: a display device that displays an image related to the basic image data or the simplified image data is further provided; and the display device performs control so as to lower a brightness of display image, when the signal transmission device is transmitting the basic image data to the external storage device.

An electronic camera according to the present invention comprises: an image capturing device that captures an image of a photographic subject and generates basic image data based thereupon; a simplified image data generation device that generates simplified image data corresponding to the basic image data which has been generated, a size of the simplified data being smaller than that of the basic image data; a transmission device that transmits at least the basic image data to an external storage device; and an internal storage device that stores the simplified image data without storing the basic image data.

In this electronic camera, it is preferred that a continuous photography control device that performs control for continuous photography is further provided; the internal storage device temporarily stores a plurality of sets of basic image data and a plurality of sets of simplified image data, during continuous photography; the transmission device transmits the plurality of sets of basic image data to the external storage device after the continuous photography has been completed; and the internal storage device deletes a set of basic image data that has been transmitted by the transmission device. In this case, it is preferred that: a display device that displays images related to the basic image data or the simplified image data is further provided; the display device displays a plurality of simplified images corresponding to the plurality of sets of simplified image data; and when the signal transmission device is transmitting a set of basic image data, the display device controls display of the plurality of simplified images so as to be able to identify a simplified image that corresponds to the set of basic image data which is being transmitted.

An image data storing system according to the present invention that transmits image data from an image data processing device to an external storage device and stores the image data in the external storage device, comprises: a basic image data acquisition device that is provided in the image data processing device and acquires basic image data; a simplified image data generation device that is provided in the image data processing device and generates simplified image data corresponding to the basic image data which has been acquired, a size of the simplified image data being smaller than that of the basic image data; a transmission device that is provided in the image data processing device and transmits at least the basic image data to the external storage device; an internal storage device that is provided in the image data processing device and stores the simplified image data without storing the basic image data; and an image storage device that is provided in the external storage device and stores at least the basic image data which has been transmitted from the image data processing device.

In this image data storing system, it is preferred that: an identifying information generation device that generates identifying information for individually identifying correspondence between the basic image data and the simplified image data, is further provided; the transmission device of the image data processing device transmits at least the basic image data and the identifying information to the external storage device; the internal storage device of the image data processing device stores the simplified image data and the identifying information; and the image storage device of the external storage device stores at least the basic image data and the identifying information that have been transmitted from the image data processing device.

In the above image data processing devices, electronic cameras and image data storing systems, it is preferred that the transmission device transmits both the basic image data and the simplified image data to the external storage device.

Or, in the above image data processing devices, electronic cameras and image data storing systems, it is preferred that the transmission device does not transmit the simplified image data to the external storage device.

An image data processing method according to the present invention comprises: acquiring basic image data; generating simplified image data corresponding to the basic image data that has been acquired, a size of the simplified image data being smaller than that of the basic image data; transmitting at least the basic image data to an external storage device; and storing the simplified image data without storing the basic image data.

A computer-readable computer program product contains a program for processing image data, and the program comprises: instructions for acquiring basic image data; instructions for generating simplified image data corresponding to the basic image data that has been acquired, a size of the simplified image data being smaller than that of the basic image data; instructions for transmitting at least the basic image data to an external storage device; and instructions for storing the simplified image data, without storing the basic image data.

It is preferred that this computer-readable computer program product is a recording medium on which the program is recorded.

Or, it is preferred that this computer-readable computer program product is a carrier wave in which the program is embodied as a data signal.

BRIEF DESCRIPTION OF THE DRAWINGS

FIG. 11 is a figure showing an arrangement for providing a program via a recording medium such as a CD-ROM or the like, or via a data signal such as the internet or the like.

DESCRIPTION OF THE PREFERRED EMBODIMENTS

In the following the present invention will be described in terms of several of its preferred embodiments.

Embodiment One

Figure 1:
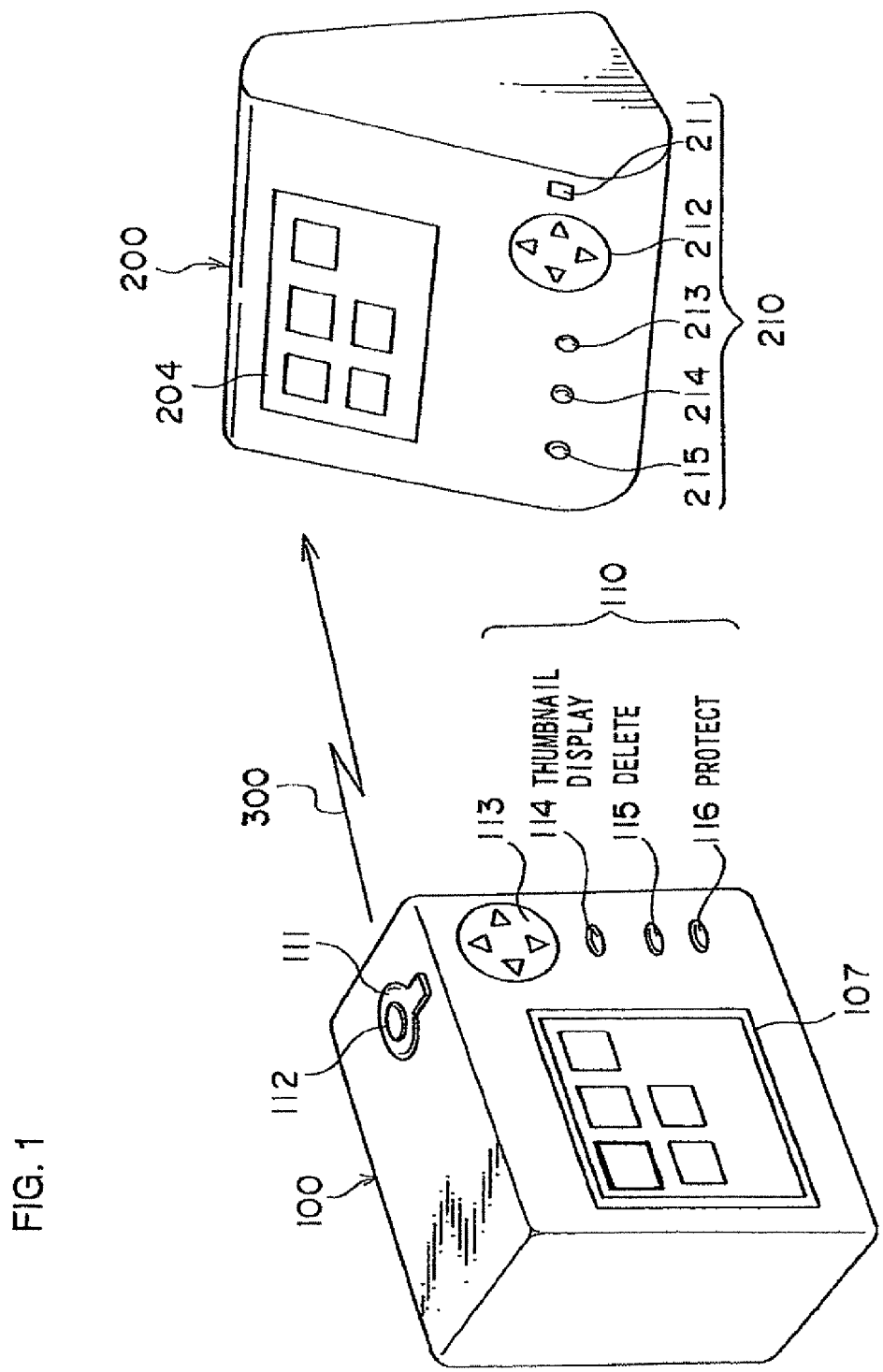
FIG. 1 is a figure showing the overall appearance of an image data file transfer system which is a first preferred embodiment of the present invention.

FIG. 1 is a figure showing the overall appearance of an image data file transfer system which is a first preferred embodiment of the present invention. Referring to this figure, an electronic still camera 100 and a data storage device 200 are connected by a communication medium (data transmission medium) 300. This communication medium 300, for example, may perform data transfer between the electronic still camera 100 and the data storage device 200 by wireless or radio communication such as Bluetooth or the like. In this first preferred embodiment of the present invention, the electronic still camera 100 is the signal transmission side for the image data, and the data storage device 200 is the signal reception side for the image data. This electronic still camera 100 records images which have been photographed as image data files in a memory internal to said camera 100, and also transmits these image data files to the data storage device 200 via the communication medium 300. On the other hand, the data storage device 200 receives these image data files which have been transmitted via the communication medium 300 from the electronic still camera 100, and records and stores these image data files which it has received in some specific recording device.

The electronic still camera 100 comprises a power supply switch 111, a shutter release button 112, a four way switch 113 which serves as a pointing device, a thumbnail display button 114, an image data delete button 115, an image data protect button 116, and a LCD display section 107. The power supply switch 111 is an actuation member which performs changeover of the power supply of this electronic still camera 100 between ON and OFF. The shutter release button 112 is an actuation member which starts photographic operation by this electronic still camera 100. The four way switch 113 is an actuation member which performs pointing actuation in the upwards, downwards, leftwards, and rightwards directions upon a display screen which is being shown upon the LCD display section 107. The LCD display section 107 can display a single photographed image according to the image data which have been photographed, and alternatively can display an array of thumbnail images. The thumbnail display button 114 is an actuation member which performs changeover of the LCD display section 107 between displaying a single photographed image, and displaying an array of thumbnail images. The actions of the image data delete button 115 and of the image data protect button 116 will be explained hereinafter. It should be understood that the various switches and buttons described above of this electronic still camera 100 may be referred to generally as actuation members 110.

Figure 2:
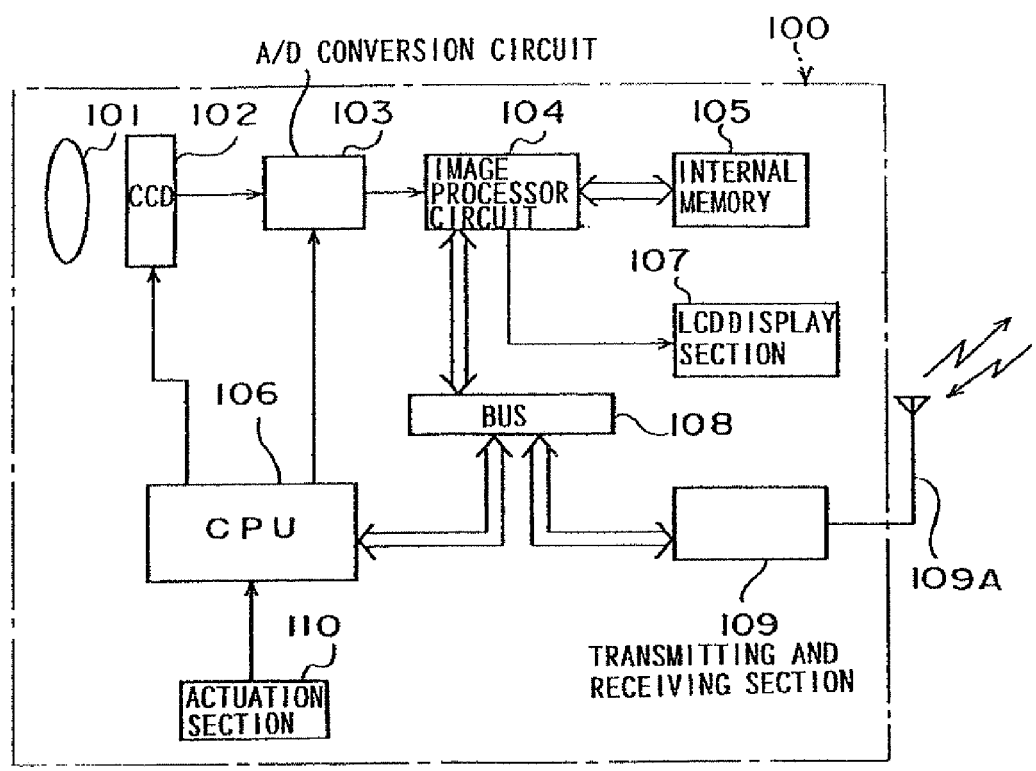
FIG. 2 is a block diagram showing the overall structure of an electronic still camera which is a component of the image data file transfer system of FIG. 1.

The data storage device 200 comprises a power supply switch 211, a four way switch 212 which serves as a pointing device, a thumbnail display button 213, an image data delete button 214, an image data protect button 215, and an LCD display section 204. The power supply switch 211 is an actuation member which performs changeover of the power supply of this data storage device 200 between ON and OFF. The four way switch 212 is an actuation member which performs pointing actuation in the upwards, downwards, leftwards, and rightwards directions upon a display screen which is being shown upon the LCD display section 204. The LCD display section 204 can display a single photographic image according to image data, and alternatively can display an array of thumbnail images. The thumbnail display button 213 is an actuation member which performs changeover of the LCD display section 204 between displaying a single photographed image, and displaying an array of thumbnail images. The actions of the image data delete button 214 and of the image data protect button 215 will be explained hereinafter. It should be understood that the various switches and buttons described above of this data storage device 200 may be referred to generally as actuation members 210. FIG. 2 is a block diagram showing the overall structure of the electronic still camera 100. Referring to this figure, the electronic still camera 100 comprises a photographic lens 101, a CCD 102, an A/D conversion circuit 103, an image processor circuit 104, an internal memory 105, a CPU circuit 106, an LCD display section 107, a data bus 108, a signal transmission and reception circuit 109, and the previously described actuation members 110. The internal memory 105 is a memory card or the like which is detachably fitted to the electronic still camera so as to be removed and replaced at the user's will. Furthermore, it is acceptable for this electronic still camera to be provided with a semiconductor memory or the like which is fitted internally thereto. The actuation members 110, as described above, include the shutter release button 112 and the like. When any one of the actuation members 110 is actuated, it sends a signal indicative of the actuation of this switch or button to the CPU circuit 106. An optical low-pass filter and a color filter (for example, Bayer filter) are disposed on the CCD 102.

When the power supply switch 111 is actuated so as to be turned ON, the CPU circuit 106 performs a predetermined ON operation of the electronic still camera 100 to start a control program. The CPU circuit 106 controls the driving of the COD 102 which is an image capturing device, and controls the operational timing for accumulating electric charges upon this CCD 102, and for reading out the accumulated electrical charges from this CCD 102. When an actuation signal is received by the CPU circuit 106 from the shutter release button 112, the CPU circuit 106 starts photographic action. An image of the subject to be photographed is focused by the photographic lens 101 upon the CCD 102, and the CCD 102 accumulates signal electric charges corresponding to the brightness of the light from the subject to be photographed which is thus incident. The signal charges which have been thus accumulated in the CCD 102 are discharged according to a timing signal by the CPU circuit 106, and the resulting signal is converted from an analog image-capture signal to a digital signal by the A/D conversion circuit 103. This signal which has been converted to digital form is fed to the image processor circuit 104, and is subjected thereby to predetermined image processing such as contour correction, gamma correction, color temperature adjustment, color space conversion processing, and the like.

The image data which has been thus subjected to predetermined image processing is further processed into image data for display by the image processor circuit 104, and is then displayed as the result of photography upon an external monitor such as the LCD display section 107 or the like. The image processor circuit 104 further performs processing upon the image data after it has been thus subjected to the predetermined image processing in order to generate thumbnail image data for thumbnail display, and also performs processing after it has been thus subjected to the predetermined image processing for data compression at a predetermined compression ratio according to the JPEG format. A predetermined file name is appended by the CPU circuit 106 to this image data which has been data compressed, and it is then recorded in the internal memory 105 together with the corresponding thumbnail image data.

This image data file which has been recorded in the internal memory 105 is transmitted to the signal transmission and reception circuit 109 via the bus 108. The signal transmission and reception circuit 109 transmits an electromagnetic wave which has been modulated so as to carry this image data signal from an antenna 109A towards the data storage device 200

Figure 3:
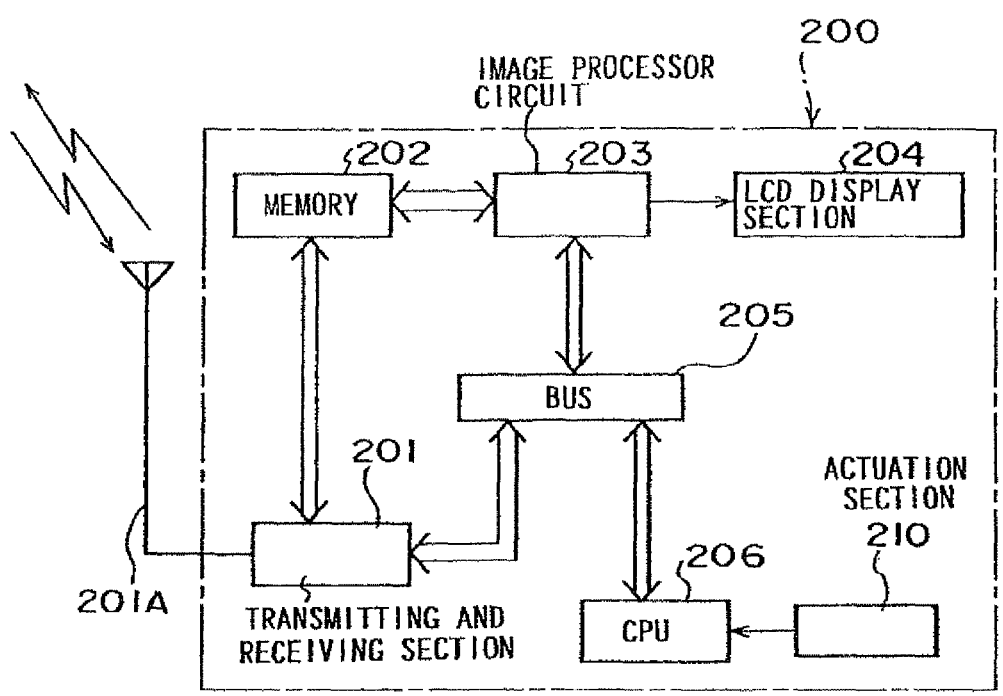
FIG. 3 is a block diagram showing the overall structure of a data storage device which is another component of the image data file transfer system of FIG. 1.

FIG. 3 is a block diagram showing the overall structure of the data storage device 200. Referring to this figure, the data storage device 200 comprises signal transmission and reception circuit 201, a memory 202, an image processor circuit 203, an LCD display section 204, a data bus 205, a CPU circuit 206, and the previously described actuation members 210. The actuation members 210, as described above, include the four way switch 212 and the like. When any one of the actuation members 210 is actuated, it sends a signal indicative of the actuation of this switch or button to the CPU circuit 106.

When the power supply switch 211 is actuated so as to be turned ON, the CPU circuit 206 performs a predetermined ON operation of the data storage device 200 to start a control program. An electromagnetic wave signal which has been received via the antenna 201A is demodulated into an image data signal by the signal transmission and reception circuit 201, and the image data file which is reconstituted from the image data signal is recorded in the memory 202. The memory 202 is the main recording device for the data storage device 200. The image data file which is recorded in the memory 202 is supplied to the image processor circuit 203, and is processed therein into image data for display. This image data for display is displayed upon an external monitor such as the LCD display section 204 or the like. The image processor circuit 203 also performs decompression processing in order to decompress image data which is in compressed form, according to requirements.

Figure 4:
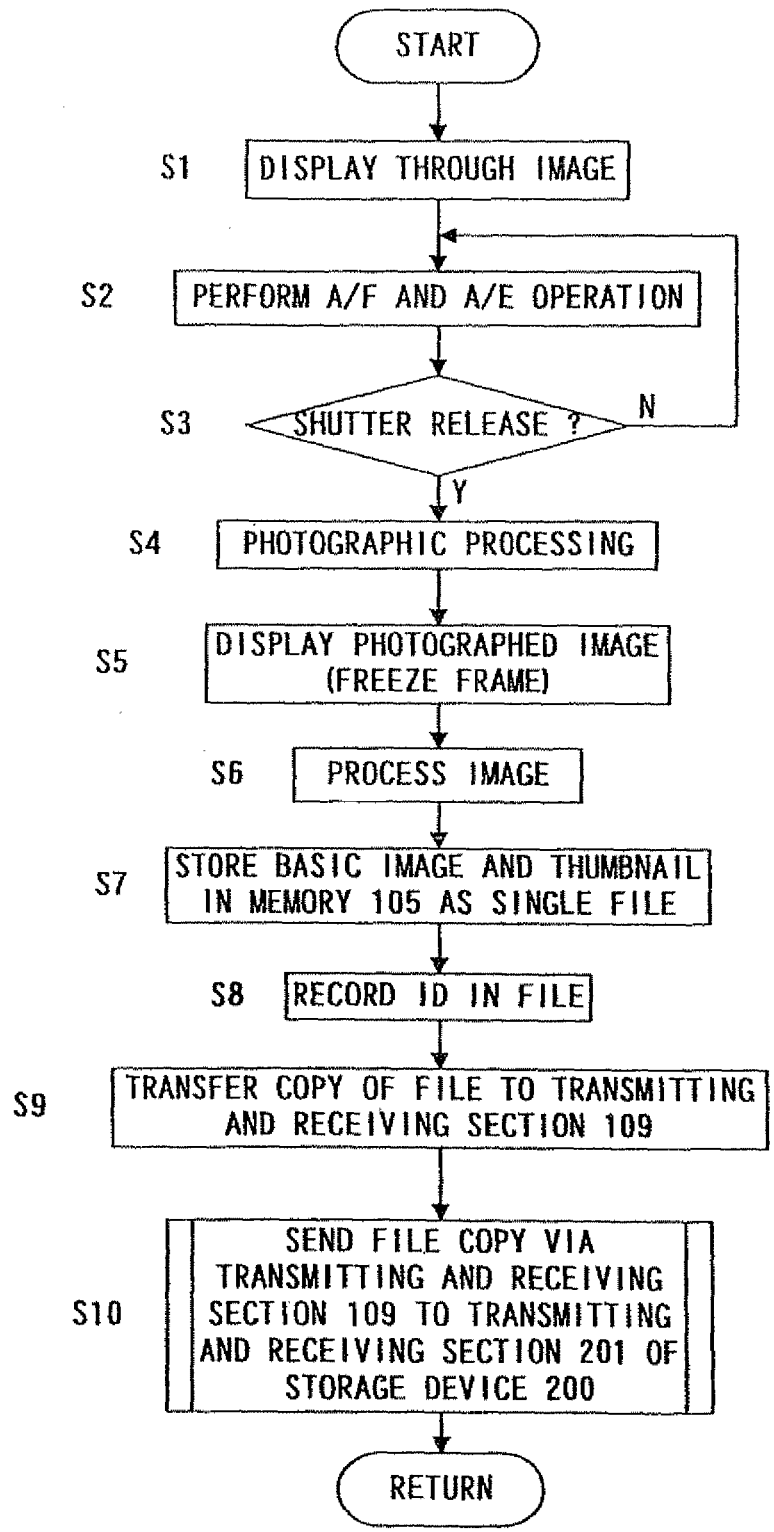
FIG. 4 is a flow chart showing the control flow of a photographic procedure performed by the electronic still camera.

The flow of a photographic procedure which is performed by the CPU circuit 106 of the electronic still camera 100 will now be explained with reference to the flow chart shown in FIG. 4. When the power supply switch 111 of the electronic still camera 100 is actuated so as to be turned ON, the program whose flow is shown in FIG. 4 is started. First in a step S1 the CPU circuit 106 performs through image display with the electronic still camera 100. In this through image display, before shutter release, images are captured by the CCD 102, and images based upon the image-capture signals which are outputted from the CCD 102 are successively displayed upon the LCD display section 107. Next in a step S2 the CPU circuit 106 drives the photographic lens 101 by an A/F device not shown in the figures so as to focus it upon the subject to be photographed, and also performs exposure calculation based upon the brightness of the subject to be photographed which is detected by a photographic subject brightness detection device also not shown in the figures. Next in a step S3 the CPU circuit 106 decides whether or not the shutter release button 112 has been actuated, and if the shutter release has been actuated then this decision in this step S3 is YES and the flow of control proceeds to a step S4, while if on the other hand the shutter release has not been actuated then this decision in this step S3 is NO and the flow of control returns to the step S2.

In the step S4 the CPU circuit 106 starts the photographic processing described above, and then the flow of control proceeds to a step S5. In this step S5 the image data which has been obtained as the result of photography is processed into image data for display by the image processor circuit 104, and is displayed as a freeze image upon the LCD display section 107. This freeze image display consists of capturing an image after shutter release actuation by the CCD 102, and displaying an image based upon the image-capture signal which has been output from the CCD 102 upon the LCD display section 107. Next in a step SE the CPU circuit 106 outputs a command to the image processor circuit 104 for data compression of an original image data according to the JPEG format at a predetermined compression ratio, and then the flow of control proceeds to a next step S7.

In this next step S7 the CPU circuit 106 records in its internal memory 105 the original image data which has been subjected to compression together with thumbnail image data as a single image data file, for example in the EXIF (Exchangeable Image File Format) file format, and then the flow of control proceeds to a next step S8. The image data which has been subjected to compression is termed the "basic image data", when contrasted with the thumbnail image data. The data size of the thumbnail image data is small by comparison with that of the basic image data, and accordingly the memory capacity which is required for storing it is quite small. In the step S8 the CPU circuit 106 records an ID in a unique region in the EXIF format file which has been recorded. This ID which is recorded may, for example, include the serial number of this electronic still camera 100, in order to make it possible for this image data file to be distinguished from other image data files which have been taken using other electronic still cameras.

Next in a step S9 the CPU circuit 106 transfers a copy of the image data file in EXIF format which has been recorded in the internal memory 105 to the signal transmission and reception circuit 109, and then the flow of control proceeds to a next step S10. In this step S10 the CPU circuit 106 performs transfer procedures for this image data by the signal transmission and reception circuit 109, and when this has been completed the procedure of FIG. 4 is terminated.

Figure 5:
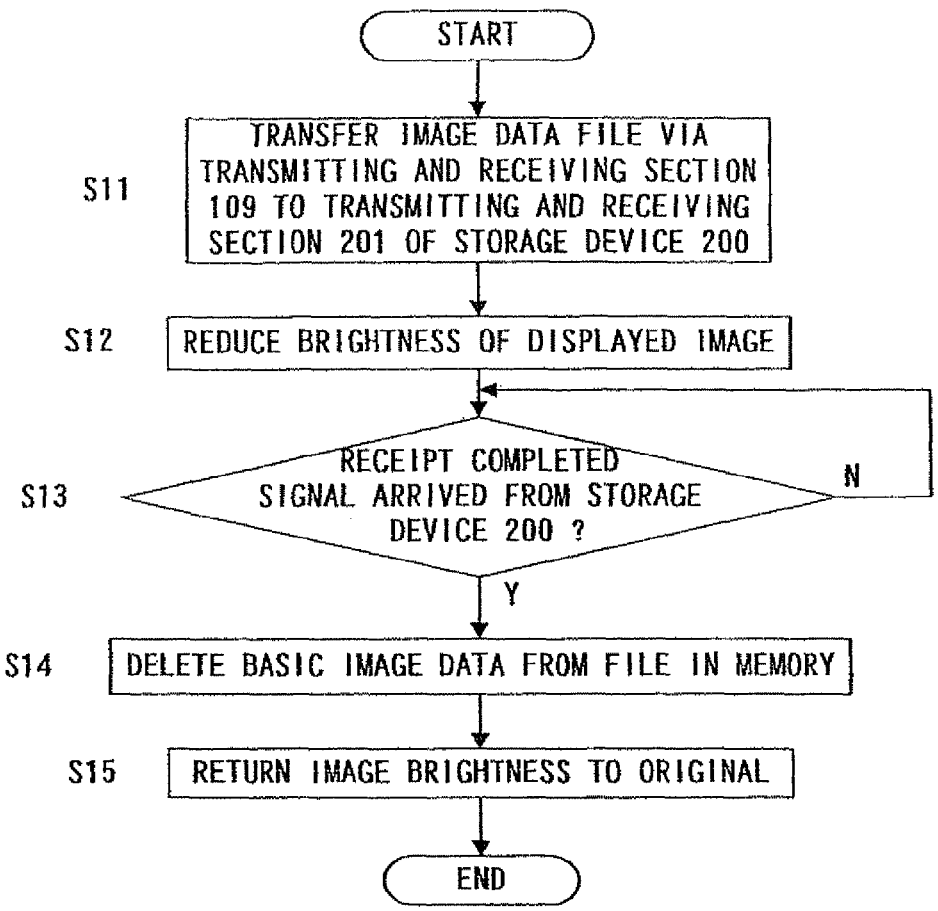
FIG. 5 is a flow chart for explanation of the control flow of a transfer procedure performed by this electronic still camera.

It should be understood that there are at least two methods for producing thumbnail image data. In one method, the original image data is reduced and the reduced image data is generated as the thumbnail image data. In another method, the original image data and the thumbnail image data are produced based on the output of CCD in parallel FIG. 5 is a flow chart for explanation of the control flow which is executed by the CPU circuit 106 during the transfer procedure of the step S10 described above. First in a step S11 the CPU circuit 106 issues a command to the signal transmission and reception circuit 109 for starting signal transmission of the image data file, and then the flow of control continues to a next step S12. In this step S12 the CPU circuit 106 outputs a command to the image processor circuit 104 for lowering the display brightness of the freeze image display which is being displayed upon the LCD display section 107, and then the flow of control continues to a next step S13. In this step S13 the CPU circuit 106 decides whether or not a receipt completed signal has been received from the data storage device 200. This receipt completed signal will be explained hereinafter. If the signal transmission and reception circuit 109 has indeed received such a receipt completed signal, then the CPU circuit 106 determines that the result of the decision in the step S13 is YES, and the flow of control proceeds to the next step S14; while on the other hand, if the signal transmission and reception circuit 109 has not received such a receipt completed signal, then the CPU circuit 106 determines that the result of the decision in the step S13 is NO, and the flow of control returns to this step S13 again, in order to repeat the decision procedure.

Next in this step S14 the CPU circuit 106 deletes the basic image data from the image data file in EXIF format which is recorded in the internal memory 105. The result of this is that the data size of the image data file which is recorded in the internal memory 105 becomes smaller. In a next step S15 the CPU circuit 106 outputs a command to the image processor circuit 104 for returning the display brightness of the freeze image display which is being displayed upon the LCD display section to its original value, and then the procedure of FIG. 5 terminates.

It should be understood that, although the present invention has been explained above in terms of the transmission of the basic image data and the thumbnail image data together as a single image data file, it would alternatively be acceptable to transmit only the basic image data, without transmitting the thumbnail image data.

Figure 6:
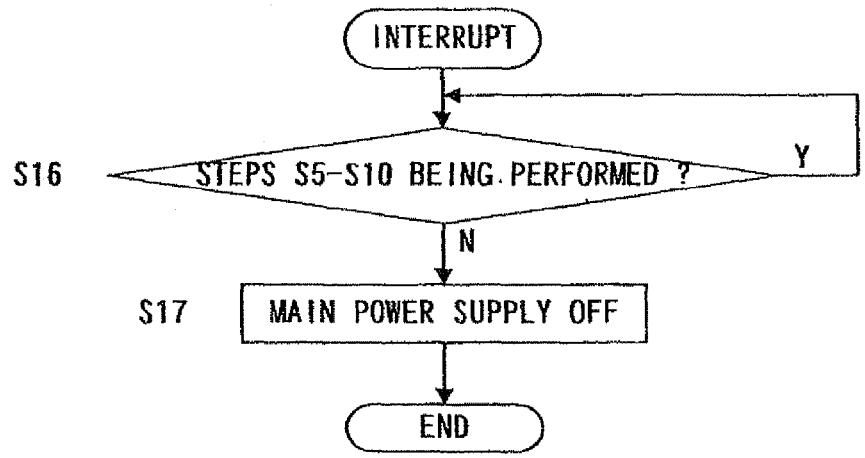
FIG. 6 is a flow chart for explanation of the control flow of an interrupt procedure.

FIG. 6 is a flow chart for explanation of the control flow of an interrupt procedure which is performed by the CPU circuit 106 when during the above described procedure of FIG. 4 and FIG. 5 an interrupt request is generated for the CPU circuit 106. Such an interrupt request is generated when an OFF actuation signal is sent from the power supply switch 111, or by an OFF timer which is set for the CPU circuit 106 in advance, or the like. The CPU circuit 106 changes over to executing the procedure of FIG. 6 when the interrupt request is generated. First in a step S16 of FIG. 6 the CPU circuit 106 detects whether or not at the time point that the interrupt was generated the steps S5 through S10 are being performed, and, if the steps S5 through S10 are being performed, then the decision in this step S16 is YES, and the system waits until the procedure of the step S10 has terminated. On the other hand, if the steps S5 through S10 are not being performed at the time point that the interrupt was generated, then the decision in this step S16 is NO, and the flow of control proceeds to a step S17. In this step S17 the CPU circuit 106 terminates the control program for the electronic still camera 100 and performs a predetermined power supply OFF procedure, and then this procedure of FIG. 6 is completed.

Figure 7:
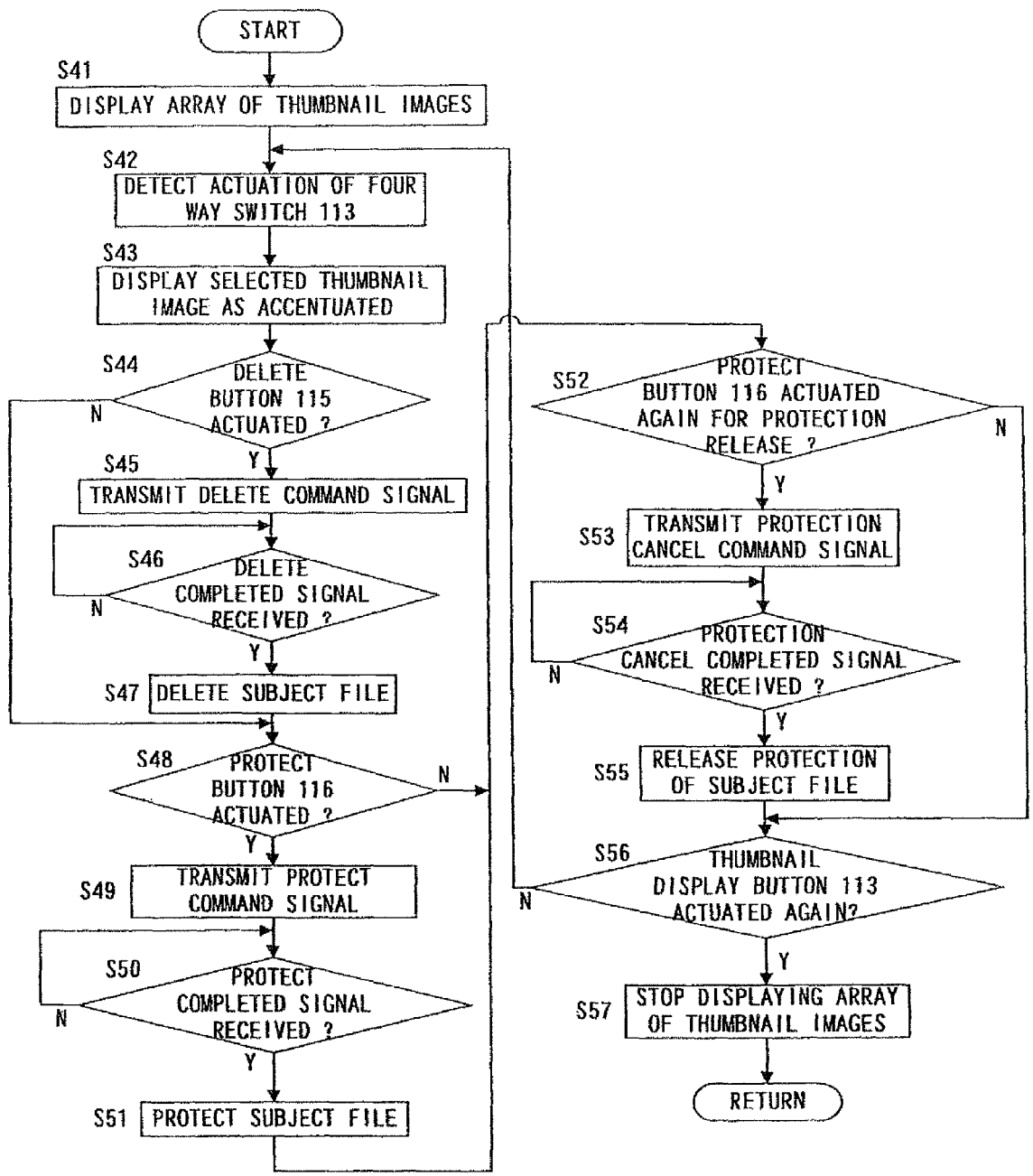
FIG. 7 is a flow chart for explanation of the control flow of signal transmission procedures for a delete command, a protect command, and a protection cancel command.

The electronic still camera 100 can also be used for transmitting various commands to the data storage device 200, such as a delete command for deleting an image data file which is stored on the data storage device 200, a protect command for ensuring that an image data file which is stored on the data storage device 200 cannot be deleted, and a protection cancel command for canceling the above described protection. FIG. 7 is a flow chart for explanation of the control flow of the program which is performed by the CPU circuit 106 when performing signal transmission procedures for the various commands described above. This program of FIG. 7 is started when the thumbnail display button 114 of the electronic still camera 100 is actuated.

First in a step S41 of FIG. 7 the CPU circuit 106 reads out in order, from among the image data files in EXIF format which are recorded in the internal memory 105, those ones of the image data files from which the basic image data has been deleted, and displays an array of images corresponding to the thumbnail image data recorded in these image data files which have been read out upon the LCD display section 107. By doing this, a thumbnail array according to the image data files which have the same ID as the image data files which are recorded on the data storage device 200 is displayed upon the LCD display section 107. This displayed array of thumbnail images is produced by the image processor circuit 104 generating data for display, this display data then being displayed by the LCD display section 107.

When providing this display of the array of thumbnail images upon the LCD display section 107, as an initial setting, as shown in FIG. 1, the frame of the one of the thumbnail images at the upper left of the screen is accentuated or highlighted. This thumbnail image which is displayed as accentuated indicates which image data file will be subjected to the actions of an image file delete command, protect command, or protection cancel command. The display of the frame of the thumbnail image as accentuated is controlled by the image processor circuit 104. The operator can select the thumbnail image which is to be the subject of the above described commands from among the thumbnail images which are displayed by actuating the four way switch 113 upwards, downwards, leftwards and rightwards, as appropriate. For example, if he wishes to select the next thumbnail image rightwards, he actuates the four way switch 113 righwards.

Next in a step S42 the CPU circuit 106 detects the actuation signal from the four way switch 113, and then the flow of control proceeds to a next step S43. In this step S43, the CPU circuit 106 selects the thumbnail image which is to be the subject of the above described commands based upon the actuation signal from the four way switch 113. The CPU circuit 106 outputs a command to the image processor circuit 104 to perform accentuated display of the selected thumbnail image, and then the flow of control proceeds to a next step S44. In this step S44 the CPU circuit 106 decides whether or not the image data delete button 115 has been actuated, and if in fact the image data delete button 115 has been actuated, then a YES decision is made in this step S44, and the flow of control proceeds to a next step S45. On the other hand, if the image data delete button 115 has not been actuated, then a NO decision is made in this step S44, and the flow of control is transferred to a step S48.

Next in the step S45 the CPU circuit 106 transmits a signal to the signal transmission and reception circuit 109 consisting of a delete command signal and the ID which is recorded in the image data file which is to be the subject of this delete command, and then the flow of control proceeds to a step S46. In this step S46 the CPU circuit 106 decides whether or not a delete completed signal has been received from the data storage device 200 by the signal transmission and reception circuit 109. If indeed a delete completed signal has been received by the signal transmission and reception circuit 109, then the CPU circuit 106 arrives at a YES decision in this step S46, and the flow of control is transferred to a next step S47; while on the other hand, if no delete completed signal has been received by the signal transmission and reception circuit 109, then the CPU circuit 106 arrives at a NO decision in the step S46, and this decision procedure is repeated. This delete completed signal will be explained hereinafter. In the step S47 the CPU circuit 106, along with deleting from the internal memory 106 the image data file which corresponds to the thumbnail image which was being displayed as accentuated, in other words the file which corresponds to the ID which has been transmitted along with the delete command, also outputs a command to the image processor circuit 104 to delete the display of the thumbnail image which was being displayed as accentuated. When the procedure of the step S47 has been completed, the flow of control proceeds to the next step S48.

Next in the step S48 the CPU circuit 106 decides whether or not the image data protect button 116 has been actuated, and if indeed the image data protect button 116 has been actuated then the result of this decision in the step S48 is YES and the flow of control proceeds to the next step S49. On the other hand, if in fact the image data protect button 116 has not been actuated then the result of this decision in the step S48 is NO and the flow of control is transferred to a step S52. In the step S49 the CPU circuit 106 transmits a signal to the signal transmission and reception circuit 109 consisting of a protect command signal and the ID which is recorded in the image data file which is to be the subject of this protect command, and then the flow of control proceeds to a step S50. In this step S50 the CPU circuit 106 decides whether or not a protect completed signal has been received from the data storage device 200 by the signal transmission and reception circuit 109. If indeed a protect completed signal has been received by the signal transmission and reception circuit 109, then the CPU circuit 106 arrives at a YES decision in this step S50, and the flow of control is transferred to a next step S51; while on the other hand, if no protect completed signal has been received by the signal transmission and reception circuit 109, then the CPU circuit 106 arrives at a NO decision in the step S50, and this decision procedure is repeated. This protect completed signal will be explained hereinafter. In the step S51 the CPU circuit 106 outputs a command to the image processor circuit 104 to superimpose a protection mark over the thumbnail image which is being displayed as accentuated, and then the flow of control proceeds to the next step S52.

Next in the step S52 the CPU circuit 106 decides whether or not, in the state in which a protection mark is being superimposed over the thumbnail image which is being displayed as accentuated, the image data protection button 116 is again being actuated; and if indeed the image data protection button 116 is being actuated again then the result of this decision in the step S52 is YES and the flow of control proceeds to a next step S53, while if in fact the image data protection button 116 is not being actuated again, then the result of this decision in the step S52 is NO, and the flow of control is transferred to a step S56. In the step S53 the CPU circuit 106 transmits a signal to the signal transmission and reception circuit 109 consisting of a protection cancel command signal and the ID which is recorded in the image data file which is to be the subject of this protection cancel command, and then the flow of control proceeds to a step S54. In this step S54 the CPU circuit 106 decides whether or not a protection cancel completed signal has been received from the data storage device 200 by the signal transmission and reception circuit 109. If indeed a protection cancel completed signal has been received by the signal transmission and reception circuit 109, then the CPU circuit 106 arrives at a YES decision in this step S54, and the flow of control is transferred to a next step S55; while on the other hand, if no protection cancel completed signal has been received by the signal transmission and reception circuit 109, then the CPU circuit 106 arrives at a NO decision in the step S54, and this decision procedure is repeated. This protection cancel completed signal will be explained hereinafter. In the step S55 the CPU circuit 106 outputs a command to the image processor circuit 104 to stop displaying the protection mark over the thumbnail image which is being displayed as accentuated, and then the flow of control proceeds to the next step S56.

Next in the step S56 the CPU circuit 106 decides whether or not the thumbnail display button 113 is being actuated again, and if indeed the thumbnail display button 113 is being actuated again then the result of this decision in the step S56 is YES and the flow of control proceeds to a next step S57, while on the other hand, if in fact the thumbnail display button 113 is not being actuated again, then the result of this decision in the step S56 is NO and the flow of control returns to the step S42. In the step S57 the CPU circuit 106 issues a command to the image processor circuit 104 to stop the display of the array of thumbnail images upon the LCD display section 107 according to the thumbnail image data, and then the procedure of FIG. 7 is terminated.

Figure 8:
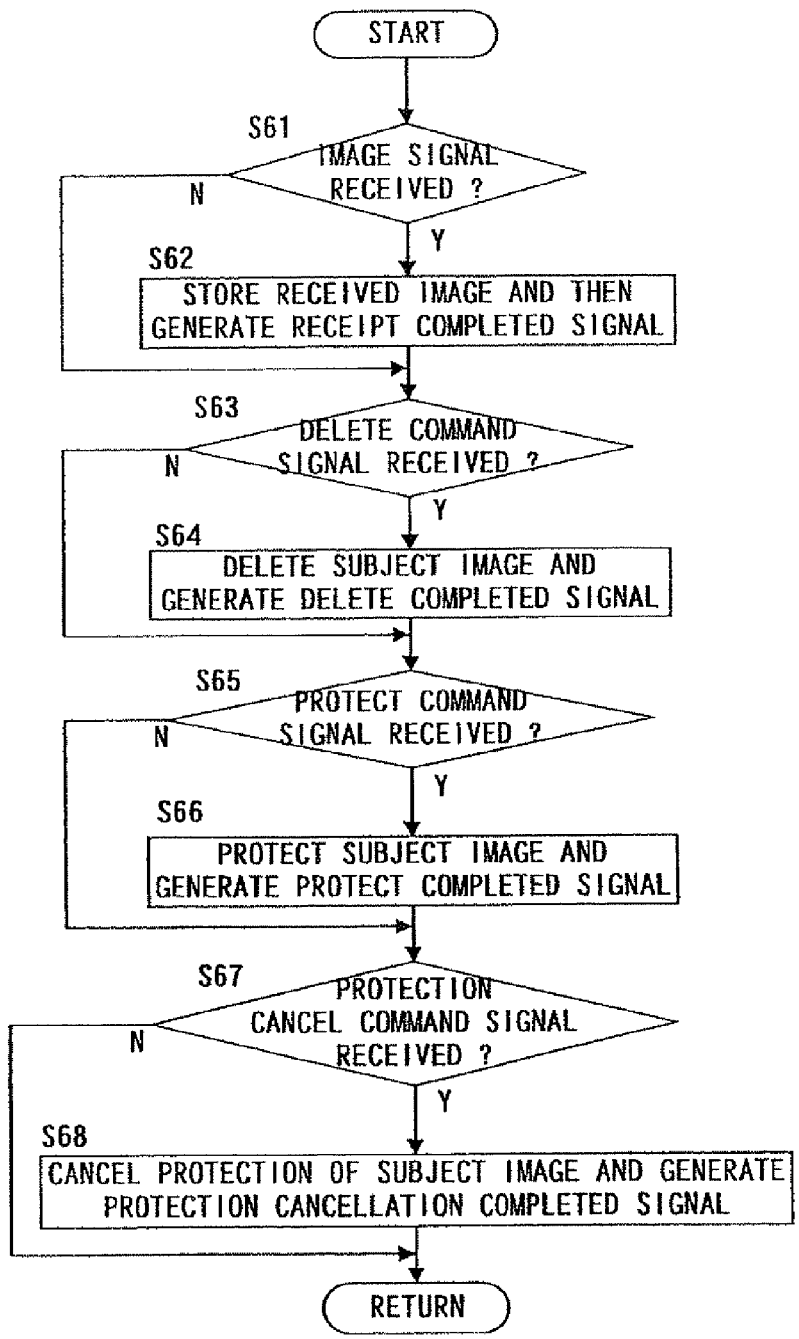
FIG. 8 is a flow chart for explanation of the control flow of a procedure which is performed by the data storage device of FIG. 3.

Next, the procedure which is executed by the data storage device 200 for per forming reception and transmission of signals from and to the electronic still camera 100 will be explained. FIG. 8 is a flow chart for explanation of the control flow of this procedure which is executed by the CPU circuit 206 of the data storage device 200. The program of FIG. 8 is started when the power supply switch 211 of the data storage device 200 is actuated to ON. First in a step S61 the CPU circuit 206 decides whether or not image data is being received by the signal transmission and reception circuit 201 from the electronic still camera 100, and if indeed image data is being received then the result of this decision in the step S61 is YES and the flow of control proceeds to a next step S62, while if in fact no image data is being received then the result of this decision in the step S61 is NO, and the flow of control is transferred to a step S63.

Next in the step S62, when the reception of image data by the signal transmission and reception circuit 201 has been completed, the CPU circuit 206 records the image data which has been received as an image data file in the memory 202. This image data file is a file in EXIF format in which the image data on which a data compression has been performed, the thumbnail image data, and the ID are recorded. Furthermore, the CPU circuit 206 outputs a command to the signal transmission and reception circuit 201 to transmit a receipt completed signal, and then the flow of control proceeds to a next step S63. This receipt completed signal is transmitted in order to inform the electronic still camera 100 that the image data has been received. This detection that the receipt of the image data has been completed is, for example, performed by detecting the so called "end of image" mark of the JPEG format data, and by also determining that the file size which is included in the header portion of the JPEG data and the size of the data which has been received agree with one another.

Next in the step S63 the CPU circuit 206 decides whether or not a delete command signal has been received from the electronic still camera 100 by the signal transmission and reception circuit 201, and if indeed a delete command signal has been received then the result of this decision in the step S63 is YES and the flow of control proceeds to a next step S64, while if in fact no delete command signal has been received then the result of this decision in the step S63 is NO and the flow of control is transferred to a step S65. In the step S64, the CPU circuit 206 deletes the image data file in the memory 202 which corresponds to the ID which has been received together with the delete command signal by the signal transmission and reception circuit 201. Furthermore, when the image data file in the memory 202 which corresponds to the ID which has been received has been deleted, the CPU circuit 206 outputs a command to the signal transmission and reception circuit 201 for transmission of a delete completed signal, and then the flow of control continues to the next step S65. This delete completed signal is transmitted in order to inform the electronic still camera 100 that the subject image data file has been deleted.

In this next step S65 the CPU circuit 206 decides whether or not a protect command signal has been received from the electronic still camera 100 by the signal transmission and reception circuit 201, and if indeed a protect command signal has been received then the result of this decision in the step S65 is YES and the flow of control proceeds to a next step S66, while if in fact no protect command signal has been received then the result of this decision in the step S65 is NO and the flow of control is transferred to a step S67. In the step S66, the CPU circuit 206 prevents and prohibits deletion from the memory 202 of the image data file which corresponds to the ID which has been received together with the protect command signal by the signal transmission and reception circuit 201. Furthermore, when the deletion of the image data file in the memory 202 which corresponds to the ID which has been received has thus been prevented, the CPU circuit 206 outputs a command to the signal transmission and reception circuit 201 for transmission of a protect completed signal, and then the flow of control continues to the next step S67. This protect completed signal is transmitted in order to inform the electronic still camera 100 that deletion of the subject image data file has been prevented.

In this next step S67 the CPU circuit 206 decides whether or not a protection cancel command signal has been received from the electronic still camera 100 by the signal transmission and reception circuit 201, and if indeed a protection cancel command signal has been received then the result of this decision in the step S67 is YES and the flow of control proceeds to a next step S68, while if in fact no protection cancel command signal has been received then the result of this decision in the step S67 is NO and the flow of control of this procedure of FIG. 8 terminates. In the step S68, the CPU circuit 206 cancels the prevention of deletion from the memory 202 of the image data file which corresponds to the ID which has been received together with the protect command signal by the signal transmission and reception circuit 201. Furthermore, when the prevention of deletion of the image data file in the memory 202 which corresponds to the ID which has been received has thus been cancelled, the CPU circuit 206 outputs a command to the signal transmission and reception circuit 201 for transmission of a protection cancellation completed signal, and then the flow of control of this procedure of FIG. 8 terminates. This protection cancel completed signal is transmitted in order to inform the electronic still camera 100 that prevention of the deletion of the subject image data file has been cancelled.

The image data file transmission system according to the first preferred embodiment of the present invention described above provides the following operational benefits.

(1) The electronic still camera 100 is made so as, upon photography, to record thumbnail image data and compressed basic image data as an image data file in its internal memory 105, so as to transmit a copy of this image data file to the data storage device 200, and so as to delete the basic image data from the image data file in its internal memory 105 when it receives a receipt completed signal transmitted from the data storage device 200. Since the basic image data does not remain in the image data file in the internal memory 105, accordingly it is possible to economize upon the capacity of the internal memory 105 which is used, and it is therefore possible to photograph and to record a greater number of frames. Furthermore, since the basic image data is only deleted after the receipt completed signal transmitted from the data storage device 200 has been received, therefore it cannot happen that the basic image data is mistakenly deleted from the electronic still camera 100 before it has been properly transmitted therefrom to the data storage device 200. Furthermore, since the thumbnail image data is stored or preserved in the internal memory 105 of the electronic still camera 100, thereby the photographer is able to display and check the images which have been transmitted to the data storage device 200 upon the LCD display section 107, even when the data storage device 200 is not nearby.

(2) It is arranged for the same ID to be recorded in the image data file which is recorded in the internal memory 105 of the electronic still camera 100, and in the image data file which is transmitted to the data storage device 200. And, when transmitting a delete command, a protect command, or a protection cancel command for an image data file from the electronic still camera to the data storage device 200, the ID of the image data file which is to be the subject of the command is also transmitted. As a result, it is possible to perform deletion, protection, or protection cancellation for each image file in the data storage device 200 individually from the electronic still camera 100.

(3) Since the above described ID is arranged to include the serial number of the electronic still camera 100, it cannot duplicate the ID with a different electronic still camera.

(4) The electronic still camera 100 and the data storage device 200 respectively comprise the signal transmission and reception circuit 109 and the signal transmission and reception circuit 201, and thereby exchange signals with one another by wireless transmission. Accordingly, the photographer can carry around the electronic still camera 100 by itself in order to perform photography, and the ease of operation is enhanced, by comparison with the case in which the electronic still camera 100 and the data storage device 200 are connected by a data cable.

(5) Since, if the power supply switch 111 of the electronic still camera 100 is turned OFF partway through the procedure of the step S5 through the step S10, at this time the procedure for turning the power supply OFF is only performed after the transmission of the image data file which has been photographed to the data storage device 200 has been completed (the NO decision in the step S16), thereby the image data file which has been photographed is prevented from becoming lost without being recorded in the data storage device 200.

(6) Since the brightness of the freeze image display which is displayed upon the LCD display section 107 of the electronic still camera 100 is reduced while the image data is being transmitted from the electronic still camera 100 to the data storage device 200 during the steps S12 through S15, thereby the photographer is enabled to check that the image data is being transferred from the fact that the brightness of the display image upon the LCD display section 107 has dropped.

Embodiment Two

In the first preferred embodiment of the present invention described above, the explanation was made in terms of single frame photography in which one frame at a time is shot. However, in the second preferred embodiment of the present invention, continuous photography or shooting is performed at a predetermined interval while the shutter release button 112 of the electronic still camera 100 is actuated.

Figure 9:
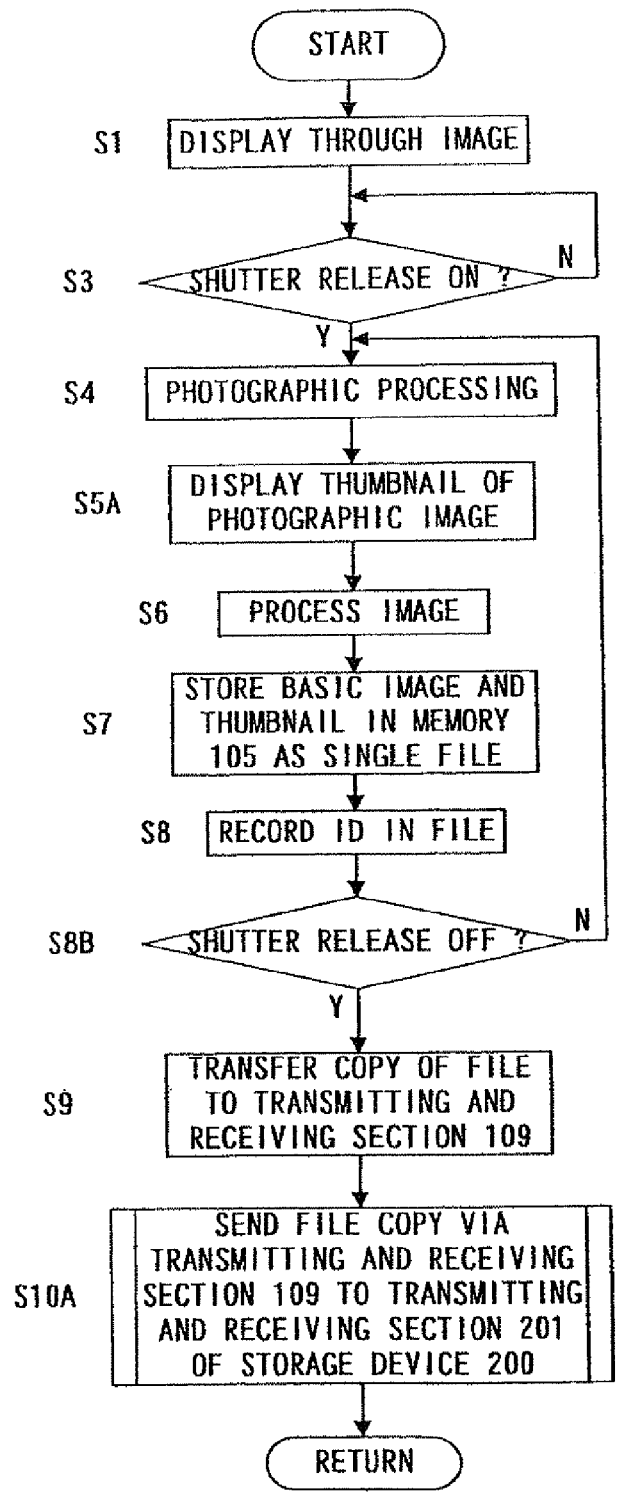
FIG. 9 is a flow chart showing the control flow of a photographic procedure performed by the electronic still camera, according to a second preferred embodiment of the present invention.

FIG. 9 is a flow chart showing the control flow of a photographic procedure which is executed by a CPU circuit 106 of an electronic still camera according to a second preferred embodiment of the present invention. It should be understood that, in this figure, to steps which perform procedures identical to ones shown in the flow chart of FIG. 4 for the case of single frame photography, the same step numbers are appended, so that the following explanation will concentrate on the procedures which are different from those shown in FIG. 4. In a step S5A of FIG. 9, the image data which has been obtained by photography is processed by the image processor circuit 104 into image data for display, and is displayed as a freeze image upon the LCD display section 107. At this time, the image processor circuit 104 displays the thumbnail image in array format, in order that the results of continuous photography can be looked at once. Every time a photographic frame is added as a result of continuous photography, the number of thumbnail images which are displayed is increased.

In a step S8B, the CPU circuit 106 checks whether or not the shutter release button 112 is now OFF, and if indeed the shutter release button 112 is now OFF then the result of this decision in the step S8B is YES and the flow of control proceeds to a next step S9, while if in fact the shutter release button 112 is not yet OFF then the result of this decision in the step S8B is NO, and the flow of control returns to the step S4.

In a step S10A, the CPU circuit 106 performs a procedure for transferring the image data to the signal transmission and reception circuit 109, and when the transfer procedure has been completed the procedure of FIG. 9 terminates. Thus, in this step S10A, the plurality of image data files which have been obtained by continuous photography are transmitted one at a time from the electronic still camera 100 to the data storage device 200.

Figure 10:
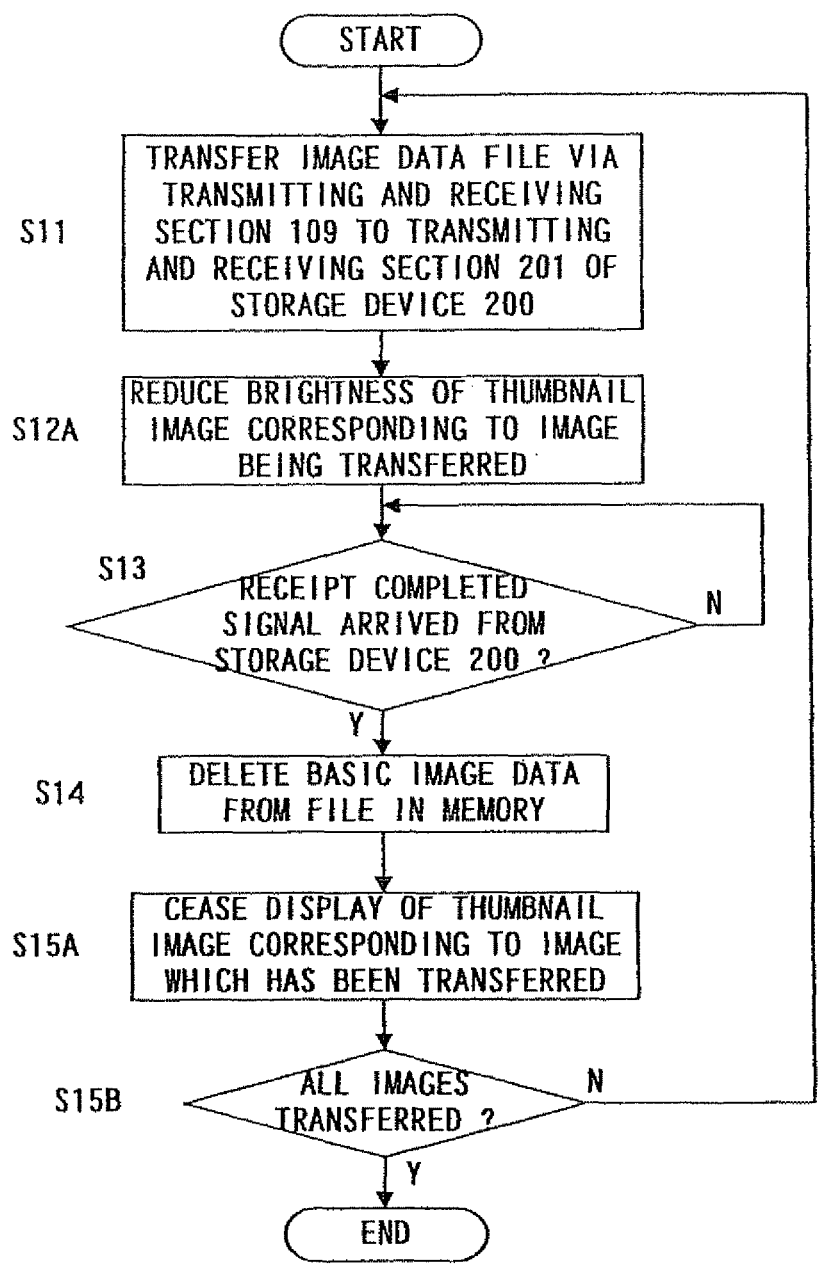
FIG. 10 is a flow chart for explanation of the control flow of a transfer procedure performed by this electronic still camera, according to the second preferred embodiment of the present invention.

FIG. 10 is a flow chart for explanation of the control flow of this transfer procedure performed by the CPU circuit 106 in the step S10A. In this figure, to steps which perform procedures identical to ones shown, in the flow chart of FIG. 5 for the case of single frame photography, the same step numbers are appended, so that the following explanation will concentrate on the procedures which are different from those shown in FIG. 5.

In a step S12A of FIG. 10, the CPU circuit 106 outputs a command to the image processor circuit 104 for lowering the display brightness of the thumbnail image which corresponds to the image data file which is being transmitted. By doing this, the operator is enabled to know which image data file is being transmitted.

In a step S15A, the CPU circuit 106 outputs a command to the image processor circuit 104 for ceasing to display the thumbnail image whose brightness is currently reduced, and then the flow of control proceeds to a step S15E. In this step S15B the CPU circuit 106 decides whether or not all of the image data files which have been obtained by continuous photography have been transmitted. If indeed all of these image data files have been transmitted then the result of this decision in the step S15B is YES and the procedure of FIG. 10 terminates, while if in fact the some image data files remain to be transmitted, then the result of this decision in the step S15B is NO, and the flow of control returns to the step S11 in order to transmit the next image data file.

According to this second preferred embodiment of the present invention as described above, it is possible to obtain the same beneficial operational results in the case of continuous photography, as in the case of single frame photography. In particular, with this second preferred embodiment of the present invention, it is possible for the operator easily to be aware of which file is currently being transmitted, and of which files have not yet been transmitted, since an array of thumbnail images which correspond to the image data files which have been obtained as a result of continuous photography is displayed upon the LCD display section 107, and, while transmitting these image data files one at a time from the electronic still camera 100 to the data storage device 200, along with reducing the display brightness of that one of these thumbnail images which corresponds to the image data file which is being transmitted, the thumbnail images which correspond to those image data files for which the transmission has been completed are deleted from the display.

Although by way of example in the above explanation the description was made in terms of the electronic still camera 100 and the data storage device 200 being connected together by wireless communication according to the Bluetooth protocol, they could also be connected by IrDA. Furthermore, it would also be possible to connect together the electronic still camera 100 and the data storage device 200 by a physical cable such as an IEEE-1394 cable, or a USB cable, or a network cable or the like.

Furthermore, although by way of example in the above explanation the description was made in terms of the electronic still camera 100 and the data storage device 200 being connected together on a one to one basis, it would be possible for the electronic still camera 100 to be provided in plurality, and/or, in the same manner, for the data storage device 200 to be provided in plurality.

Since the ID which is recorded in each image data file is arranged to include the serial number of the electronic still camera 100, accordingly it becomes possible to distinguish the image data file from an image data file of a different electronic still camera and there is no danger that an image data file which has been shot by using the different electronic still camera is mistakenly deleted.

It should be understood that, instead of the ID including the serial number of the electronic still camera 100, it would alternatively be possible for it to include symbols, characters or digits identifying the electronic still camera 100 or the photographer.

Although in the above described preferred embodiments the brightness of the thumbnail image which was displayed upon the LCD display section 107 was reduced while the corresponding image data file was being transmitted from the electronic still camera 100 to the data storage device 200, it would be acceptable, instead of reducing its brightness, to display this thumbnail image as flashing, or in a different color, or to provide an overlaid display of an icon or text information superimposed upon the thumbnail image display, in order to show that the corresponding image data file was being transmitted.

Although the above explanation was made in terms of the commands for deleting, protecting, or cancelling the protection of image data files which were recorded in the memory 202 of the data storage device 200 being issued by actuation of the electronic still camera 100, it would also be possible for these commands to be issued by actuation of the data storage device 200. In this case, it would be possible for such commands to be issued by actuation of the four way switch 212, the thumbnail display button 213, the image data delete button 214, and the image data protect button 215.

Moreover, although the above explanation was made in terms of an image data file transfer system which dealt with still image data which was obtained as a result of photography with an electronic still camera 100, the present invention could equally well be applied to a data file transfer system which dealt with moving image data.

Furthermore, although by way of example the explanation was made in terms of the electronic still camera 100, it should not be considered as being limited to the case of an electronic still camera. Any device which performs image capture using an image capturing element such as a CCD or the like and which accumulates the resulting image data internally, and which transmits this image data to an external device, could equally well be the subject of the present invention. For example, the present invention could be applied to a scanner, a PDA a portable telephone (a cellular phone), a portable personal computer such as a notebook personal computer or the like, or to any device which incorporates an image capturing element.

Furthermore, the data storage device 200 could be constituted as a personal computer or the like. The personal computer might be connected via an interface cable such as a USB cable or the like to a Bluetooth adapter, in order to perform wireless transmission. A hard disk device or the like of the personal computer would then be used as the memory 202.

Figure 11:
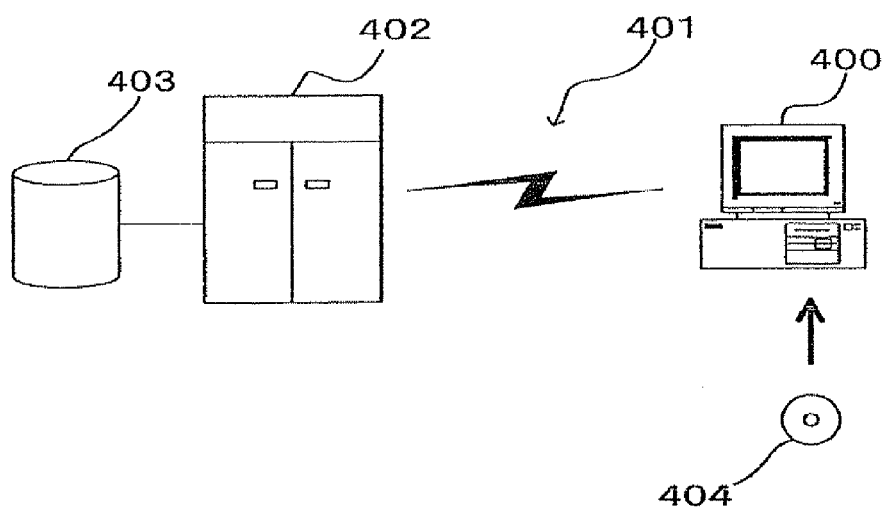

It should be understood that a program to be executed by a personal computer can be provided via a recording medium such as a CD-ROM, or via a data signal transmission means such as the internet or the like. FIG. 11 is a figure showing such an arrangement. A program is loaded into a personal computer 400 from a CD-ROM 404. Furthermore, the personal computer 400 is endowed with the function of connection to a communication line 401. A computer 402 is a server computer which offers the above described program, and which stores the program upon a recording medium such as a hard disk 403 or the like. The communication line 401 may be the internet, a communication line such as a personal computer communication line or the like, or a dedicated communication line. The computer 402 reads out the program from its hard disk 403, and transmits this program to the personal computer 400 via the communication line 401. In other words, the program is embodied as a data signal in a carrier wave, and is transmitted via the communication line 401. In this manner, the program can be provided in the form of a computer-readable computer program product in various forms, such as a recording medium or a data signal impressed upon a carrier wave or the like.

It should be understood that the data storage device 200 may have a printing function. In this case, the command set outputted from the electronic still camera 100 may include a print command for making the data storage device 200 print out a designated image. Also, the command set outputted from the electronic still camera may include a command for transmitting a copy of the designated basic image data stored in the data storage device 200 to the electronic camera 100.

What is claimed is:

1. A system comprising:
a mobile device having a first memory and a first controller electrically connected to the first memory,
the first memory storing a plurality of a first type of image data,
the first controller controlling to delete at least one of the plurality of first type of image data in response to a manipulation by a user and outputting a delete command signal corresponding to a command associated with the manipulation; and
a storage device having a second memory and a second controller,
the second memory storing a plurality of a second type of image data, each of the plurality of second type of image data corresponding to each of the plurality of the first type of image data, a size of each of the plurality of second type of image data being larger than a size of the corresponding each of the plurality of first type of image data,
the second controller controlling to delete at least one of the plurality of second type of image data in response to the delete command received from the first controller, and
the second controller controlling to output a delete completed signal after having deleted the at least one of the plurality of second type of image data,
wherein the first controller controls to delete the at least one of the plurality of first type of image data from the first memory after having received the delete completed signal from the second controller.

2. A system according to claim 1,
wherein the mobile device is a camera.

3. A system according to claim 1,
wherein the storage device is an external device different from the mobile device.

4. A system comprising:
a mobile device having a first memory and a first controller electrically connected to the first memory,
the first memory storing a plurality of a first type of image data,
the first controller controlling to protect at least one of the plurality of first type of image data in response to a manipulation by a user and outputting a protect command signal corresponding to a command associated with the manipulation; and
a storage device having a second memory and a second controller,
the second memory storing a plurality of a second type of image data, each of the plurality of second type of image data corresponding to each of the plurality of the first type of image data, a size of each of the plurality of second type of image data being larger than a size of the corresponding each of the plurality of first type of image data,
the second controller controlling to protect at least one of the plurality of second type of image data in response to the protect command received from the first controller, and
the second controller controlling to output a protect completed signal after having protected the at least one of the plurality of second type of image data,
wherein the first controller controls to protect the at least one of the plurality of first type of image data from being deleted from the first memory after having received the protect completed signal from the second controller.

5. A system according to claim 3,
wherein the second type of image data is transmitted from the mobile device to the storage device.

6. A system according to claim 4,
wherein the mobile device is a camera.

7. A system according to claim 4,
wherein the storage device is an external device different from the mobile device.

8. A system according to claim 7,
wherein the second type of image data is transmitted from the mobile device to the storage device.

* * * * *